United States Patent
Minor et al.

(10) Patent No.: US 10,939,694 B2
(45) Date of Patent: Mar. 9, 2021

(54) DRINK WATER TREATMENT COMPOSITION, AND METHOD OF MAKING A DRINK WATER TREATMENT COMPOSITION

(71) Applicant: THIRD WAVE WATER LLC, Cedarville, OH (US)

(72) Inventors: Taylor Minor, Cedarville, OH (US); Charles R. Nick, Centerville, OH (US)

(73) Assignee: THIRD WAVE WATER LLC, Cedarville, OH (US)

( * ) Notice: Subject to any disclaimer, the term of this patent is extended or adjusted under 35 U.S.C. 154(b) by 349 days.

(21) Appl. No.: 15/792,128

(22) Filed: Oct. 24, 2017

(65) Prior Publication Data
US 2018/0110242 A1 Apr. 26, 2018

Related U.S. Application Data

(60) Provisional application No. 62/412,426, filed on Oct. 25, 2016.

(51) Int. Cl.
| | | |
|---|---|---|
| *A23L 2/52* | (2006.01) | |
| *A23L 3/16* | (2006.01) | |
| *A23F 5/00* | (2006.01) | |
| *A23L 5/00* | (2016.01) | |
| *A23L 2/39* | (2006.01) | |
| *C02F 1/68* | (2006.01) | |
| *A23L 29/294* | (2016.01) | |
| *A23L 33/16* | (2016.01) | |

(52) U.S. Cl.
CPC .................. *A23L 2/52* (2013.01); *A23F 5/00* (2013.01); *A23L 2/39* (2013.01); *A23L 3/16* (2013.01); *A23L 5/00* (2016.08); *A23L 29/294* (2016.08); *A23L 33/16* (2016.08); *C02F 1/68* (2013.01); *A23V 2002/00* (2013.01)

(58) Field of Classification Search
CPC ............... A61K 35/08; A23V 2002/00; A23V 2250/161; A23V 2250/1578; A23V 2250/156; A23L 2/52; A23L 33/16; A23L 2/39; A23L 2/00; A23L 2/54
See application file for complete search history.

(56) References Cited

U.S. PATENT DOCUMENTS

| | | | |
|---|---|---|---|
| 3,624,201 A | 11/1971 | Balassa | |
| 4,325,975 A * | 4/1982 | Lindon | A23L 2/38 210/749 |
| 5,149,552 A | 9/1992 | Vidal et al. | |
| 5,208,372 A | 5/1993 | Vidal et al. | |
| 5,612,026 A | 3/1997 | Diehl | |
| 6,827,954 B2 | 12/2004 | Prosise et al. | |
| 7,713,559 B2 | 5/2010 | Zeller et al. | |
| 2004/0241299 A1 | 12/2004 | Zhang | |
| 2009/0011088 A1 | 1/2009 | Beeman et al. | |
| 2009/0053389 A1 * | 2/2009 | Vangala | A23C 9/1522 426/658 |
| 2019/0062183 A1 * | 2/2019 | Makarov | A23L 2/38 |

FOREIGN PATENT DOCUMENTS

| | | | |
|---|---|---|---|
| CN | 1871948 A | 12/2006 | |
| EP | 0515110 A2 | 11/1992 | |
| RU | 2009121764 A | 12/2010 | |
| WO | 2007/100599 A2 | 9/2007 | |
| WO | 2014/039477 A1 | 3/2014 | |
| WO | WO-2017052416 A1 * | 3/2017 | A23L 33/16 |

OTHER PUBLICATIONS

Graham, Judith; International Search Report and the Written Opinion of the International Searching Authority for PCT Application No. PCT/US2017/058059, filed Oct. 24, 2017; European Patent Office; Rijswijk, Netherlands; dated Feb. 16, 2018.

Mintel; GNPD Database; "Lemon Lime-Ade Electrolyte Hydration Drink Mix"; XP-002777790; Oct. 2013.

* cited by examiner

*Primary Examiner* — Hong T Yoo
(74) *Attorney, Agent, or Firm* — Thomas E. Lees, LLC

(57) ABSTRACT

A drink water treatment composition comprises a first edible, water-soluble salt that has a weight, e.g., between about 15% and about 25% by weight of the composition, and a second edible, water-soluble salt that has a weight, e.g., between about 65% and about 75% by weight of the composition and in admixture with the first edible, water-soluble salt. The composition can also include a third edible, water-soluble salt that has a weight, e.g., between about 5% and about 10% by weight of the composition and in admixture with the first and second edible, water-soluble salts. The mixture of edible, water-soluble salts is packaged in an effective amount to be mixed and dissolved in a reference amount of drinking water to re-mineralize the drinking water for human ingestion.

11 Claims, No Drawings

US 10,939,694 B2

DRINK WATER TREATMENT COMPOSITION, AND METHOD OF MAKING A DRINK WATER TREATMENT COMPOSITION

CROSS REFERENCE TO RELATED APPLICATIONS

This application claims the benefit of U.S. Provisional Patent Application Ser. No. 62/412,426, filed Oct. 25, 2016, entitled DRINK WATER TREATMENT COMPOSITION, AND METHOD OF MAKING A DRINK WATER TREATMENT COMPOSITION, the disclosure of which is hereby incorporated herein by reference.

BACKGROUND

Various aspects of the present disclosure relate generally to water treatment compositions, and specifically to a drink water treatment composition, and method of making a drink water treatment composition.

Water is used to make various types of drinks, including hot beverages and cold beverages. For instance, to make a hot beverage such as coffee, coffee grounds from coffee beans are mixed with heated (e.g., near-boiling) water. The flavor in coffee is mostly contained within oils within the coffee beans (i.e., the coffee grounds). More particularly, as the heated water is passed through the coffee grounds, the flavor is extracted from the oils within the ground coffee beans. After a short steeping period, the coffee grounds are strained out of the mixture using a coffee filter. The filtered liquid is the beverage (i.e., the coffee) for drinking.

BRIEF SUMMARY

According to aspects of the present disclosure, a drink water treatment composition comprises a first edible, water-soluble salt that has a weight between about 15% and about 25% by weight of the composition. The drink water treatment composition also comprises a second edible, water-soluble salt that has a weight between about 65% and about 75% by weight of the composition and in admixture with the first edible, water-soluble salt. Also, the drink water treatment composition comprises a third edible, water-soluble salt that has a weight between about 5% and about 10% by weight of the composition and in admixture with the first and second edible, water-soluble salts. Under this configuration, the mixture of the first, second, and third edible, water-soluble salts is packaged in an effective amount to be mixed and dissolved in a reference amount of drinking water to re-mineralize the drinking water for human ingestion.

By way of example, as will be described in greater detail herein, the edible, water-soluble salts can comprise a combination of calcium (e.g., calcium citrate), magnesium (e.g., magnesium sulfate), sodium (e.g., sodium chloride), potassium (e.g., potassium bicarbonate), combinations thereof, etc. Moreover, in a practical application, the reference amount of drinking water comprises one gallon (3.785 liters) of drinking water selected from at least one of distilled water, deionized water, reverse osmosis water, etc.

According to further aspects of the present disclosure, a method of making a drink water treatment composition is provided. The method comprises admixing calcium with an edible, water-soluble salt (or combination of edible, water-soluble salts) by mixing the calcium in an effective amount to prevent caking and clumping of the edible water-soluble salt. The method also comprises packaging the mixture in an effective amount to be mixed and dissolved in a reference amount of drinking water to re-mineralize the drinking water for human ingestion.

DETAILED DESCRIPTION

Aspects of the present disclosure provide water treatment compositions that re-mineralize drinking water. The drink water treatment compositions described herein are particularly well suited for applications such as brewing coffee, because flavor of the coffee is rendered consistent, and in many cases improved for a brew that is prepared using a disclosed water treatment composition. It has been surprisingly found that in the application of coffee brewing, there must be a mineral content in the brewing water to get a flavorful coffee. A drink water treatment composition as set out herein, can be implemented to re-mineralize brewing water to achieve desired mineral concentrations. For instance, in some embodiments, the re-mineralization is calibrated to satisfy best-practice specifications of the Specialty Coffee Association of America. In additional and/or alternative embodiments, the re-mineralized water provides a general-purpose drinking water that can be used to prepare beverages other than coffee, including tea, beer and other water-based beverages.

The drink water treatment compositions herein, are for purposes of re-mineralizing water. In this regard, as used herein, the term "re-mineralized" includes mineralizing, increasing mineral content, re-mineralizing, or otherwise altering the mineral content of corresponding drinking water. The drink water treatment compositions herein are expressly not for fortifying nutrition (e.g., vitamin, and mineral supplements), for providing a synthetic substitution of natural ingredient (e.g., such as sugar), or for defining the drink beverage itself (e.g., such as ready to drink mixes).

It has been discovered that a drink water treatment composition herein, is water-stable, in that there is no visible sediment or hazing of the water. In certain embodiments, drink water treated with the drink water treatment composition herein can sit without stirring, shaking, or other agitation. In this regard, such drink water treated with the drink water treatment composition herein has been observed to sit at rest for over 30 days without any signs of sediment, hazing, or other visible signs of treatment composition falling out of solution in a reference amount of drinking water.

Moreover, the drink water treatment composition described herein can be admixed to a specific composition that takes into account the source of the water before re-mineralization. For example, the mineral content of water distilled at one location may be different from the mineral content of water distilled at another location. As such, a specific drink water treatment composition can be tailored for the distilled water at each location to obtain consistent water, e.g., the most flavorful coffee at each location, etc.

Moreover, according to certain aspects herein, drink water treatment compositions are conveniently packaged in small packets/doses that make it practical to re-mineralize water in a small quantity, e.g., a liter, gallon, or other easily obtainable quantity, as may be desirable to re-mineralize brewing water for making coffee. For example, purified water such as deionized water or distilled water can be re-mineralized by a drink water treatment composition herein to provide brewing water to attain the desired flavorful coffee. In this regard, the purified water can be processed, e.g., purified by the user, or the purified water can be obtained from a third party source, e.g., purchased at a local grocery store. Thus, the drink water treatment compositions herein avoid the need for expensive water-processing equipment to make flavorful coffee.

The disclosure herein provides a number of embodiments or examples for implementing different features of various embodiments. Specific examples of components and arrangements are described to simplify the present disclosure. These are merely examples and not intended to be limiting.

In particular, a drink water treatment composition is made in accordance with various embodiments of the present disclosure. The specific drink water treatment composition may vary depending upon the particular application and the location of the application, for example.

More specifically, each of the following examples describes a drink water treatment composition or a method of making a drink water treatment composition in accordance with various embodiments. Each embodiment is intended to be illustrative and not to be construed to limit the claims of the present application in any way.

Unless otherwise indicated, all percentages and ratios are calculated by weight. Also, unless otherwise indicated, all percentages and ratios are based on the total composition.

As used herein, the term "reference amount of drinking water", means that amount of drinking water designated for an associated individual treatment, e.g., a dose, packet, vial, as intended for personal use. In practical applications, a reference amount of drinking water is an easily identifiable and measurable small quantity of drinking water, e.g., a single serving such as a cup, a pint, a quart, a gallon, a liter, etc.

As used herein, the term "effective amount" means an amount of an ingredient or a mixture sufficient to re-mineralize a corresponding reference amount of drinking water.

As an example, an effective amount can comprise an amount necessary to produce a described result, an equivalent thereof, or reasonable approximation of the result. For instance, in many embodiments, especially where the result may be characterized as subjective or arguably subjective (e.g., quality of taste), an effective amount is an amount sufficient to bring about a scientifically objective measurable change described by an associated result.

A drink water treatment composition herein added to water provides water that has a specified balance of minerals, e.g., calcium, magnesium, sodium, potassium, combinations thereof, etc., to provide a consistent beverage. That is, by re-mineralizing water to a consistent level of minerals, water variability is eliminated, which could otherwise affect beverage consistency. Moreover, in many embodiments, the result is a flavorful beverage. In certain embodiments, the ingredients are limited to only those minerals that contribute to a beneficial drink water without providing any ingredients that may be detrimental to the perceived flavor, which can lead to potential claims of detriment to nutrition or detriment to health, etc.

The packaging of the drink water treatment composition is simple, low cost, and easy to use. The user need only pour, dump, or otherwise apply a single application of the drink water treatment composition into the reference amount of drinking water, then lightly shake, stir, or otherwise agitate to mix the mixture thoroughly in the reference amount of drinking water. Accordingly, a person using a drink water treatment composition herein can enjoy drinking beverages (e.g., flavorful coffee) in a low cost, simple to implement manner.

In a practical application, the drink water treatment composition in a small use application (i.e., a single dosage package) allows a person to start with a neutral water base (e.g., deionized water or distilled water) and then add a proper mineral blend for a "perfect" brewing water. The amount of brewing water can be for a single cup of coffee, for example. As another example, the amount of brewing water can be up to about 10 gallons of brewing water.

In certain embodiments, the drink water treatment composition includes calcium, magnesium, and sodium. In further embodiments, the drink water treatment composition consists of (is solely formed by) calcium and magnesium (or an equivalent such as calcium chloride). In further example implementations, the drink water treatment composition consists of (is solely formed by) calcium, magnesium (or an equivalent such as calcium chloride), and sodium. In yet further example implementations, the drink water treatment composition consists of (is solely formed by) calcium, magnesium (or an equivalent such as calcium chloride), and potassium (e.g., potassium bicarbonate).

In this regard, all of the ingredients contribute to the effect (e.g., improved flavor) of the treated drinking water. That is, no ingredient is provided solely for an ancillary reason (e.g., as a preservative, or serving some role not desired to be present in the drinking water).

Here, the calcium can be provided as an anti-caking, anti-clumping ingredient to enable the magnesium to be ground down and packaged into small, personal use sizes, e.g., to treat a small quantity of drinking water as set out more fully herein. Here, other ingredients may be added and/or substituted. By way of example, the magnesium can be replaced by an amount of calcium chloride. In this regard, calcium citrate may be preferred over calcium chloride and/or calcium bicarbonate, each of which has a detrimental effect to the subjective attributes desired in coffee brewing water. For instance, calcium chloride can cause clumping or the formation of clumps/balls of different sizes that limit the usefulness of a product intended for small applications (e.g., the treatment of a gallon or less of water per treatment). This is because the clumps can affect automated machinery that packages the mixture into small packages. Calcium silica can alternatively be used in place of calcium citrate. However, calcium silica may be deemed undesirable due to the potential for health concerns over its use.

Although several examples are described in detail below, a general example is presented for clarity of understanding aspects of the present disclosure. In an example implementation, magnesium is ground down to a desired average particle size, e.g., a particle size of approximately 200 micrometers or less. With a known quantity of magnesium ground, an amount of calcium citrate and sodium are back computed to achieve a desired set of ratios when the mixture is measured out into individual treatments. For instance, an example individual treatment suitable for treating one gallon of distilled or deionized water is 1100 milligrams of magnesium, 300 milligrams of calcium citrate, and 100 milligrams of sodium chloride. In practical applications however, the calcium citrate can be in the range of 15% up to 20%. However, the percentage of calcium citrate can extend up to the soluble limit of the calcium citrate given the reference amount of drinking water. In this regard, the soluble limit is temperature dependent, and accordingly, the temperature and volume of drinking water will affect the upper limit of calcium citrate.

The calcium citrate, when acting as an anti-caking agent in addition to a mineralizing agent, adds bulk, but does not significantly affect TDS. As such, the calcium citrate can be added in an amount effective to cause the mixture to not cake, clump or otherwise form drastically varying particle sizes that adverse small packaging efforts.

To fill individualized treatments, a volume method is used to measure out a defined amount of mixture corresponding to one treatment. Here, it is undesirable to allow the calcium citrate to settle before packaging. As such, tumbling, barrel rolling, shaking, vibrating, etc., may be utilized to maintain adequate mixture of the ingredients before packaging.

In this regard, although a volume method is used to individualize treatments, the individual treatments could alternatively be measured out using other approaches, e.g., measurement by weight, using a corkscrew automated machine, etc.

EXAMPLE 1

Drink Water Treatment Composition

A drink water treatment composition comprises a first edible, water-soluble salt that has a weight between about 15% and about 25% by weight of the composition, a second edible, water-soluble salt that has a weight between about 65% and about 75% by weight of the composition and in admixture with the first edible, water-soluble salt, and a third edible, water-soluble salt that has a weight between about 5% and about 10% by weight of the composition and in admixture with the first and second edible, water-soluble salts. The mixture of the first, second, and third edible, water-soluble salts is packaged in an effective amount to be mixed and dissolved in a reference amount of drinking water to re-mineralize the drinking water for human ingestion.

In an example implementation, a first one of the edible, water soluble salts (i.e., a first one selected from one of the first edible, water-soluble salt, second edible, water-soluble salt, and third edible, water soluble salt) comprises an edible, water-soluble calcium salt. Also, a second one of the edible, water soluble salts (i.e., a second one selected from one of the first edible, water-soluble salt, second edible, water-soluble salt, and third edible, water soluble salt) comprises an edible, water-soluble magnesium salt. Further, a third one of the edible, water soluble salts (i.e., a third one selected from one of the first edible, water-soluble salt, second edible, water-soluble salt, and third edible, water soluble salt) comprises a select one of an edible, water-soluble sodium salt and an edible, water-soluble potassium bicarbonate salt.

In a particular example, the edible, water-soluble calcium salt comprises calcium citrate. The edible, water-soluble magnesium salt comprises magnesium sulfate. Also, the edible, water-soluble sodium salt comprises sodium chloride and the edible, water-soluble potassium salt comprises potassium bicarbonate (depending upon which, if not both, are used).

In some embodiments, the first edible, water-soluble salt comprises calcium citrate, the second edible, water-soluble salt comprises magnesium sulfate, and the third edible, water-soluble salt comprises sodium chloride.

In some embodiments, the calcium citrate has a weight greater than 15% by weight of the composition.

In some embodiments, the calcium citrate has a weight greater than 15% by weight of the composition, and less than the water solubility limit of calcium citrate as determined by a volume of the reference amount of drinking water.

In some embodiments, the magnesium sulfate has a weight that is greater than 70% by weight of the composition, and the sodium chloride (and/or potassium bicarbonate) has a weight that is less than about 10% by weight of the composition.

In some embodiments, the treatment composition is packaged as a solid powder, in a package such that the weight of the composition is about 1500 milligrams (mg). Here, the calcium citrate has a weight of about 300 mg. Moreover, in a first example implementation, the magnesium sulfate has a weight of about 1000-1100 mg (e.g., 1050 mg or 1100 mg in specific examples), and the sodium chloride has a weight of about 100-200 mg (e.g., 100 mg or 150 mg in specific examples). In a second example implementation, the magnesium sulfate has a weight of about 1000-1100 mg (e.g., 1050 mg or 1100 mg in specific examples) and the potassium bicarbonate has a weight of about 100-200 mg (e.g., 100 mg or 150 mg in specific examples). In a third example implementation, the magnesium sulfate has a weight of about 100-200 mg (e.g., 100 mg or 150 mg in specific examples) and the potassium bicarbonate has a weight of about 1000-1100 mg (e.g., 1050 mg or 1100 mg in specific examples).

In some embodiments, each of the first edible, water-soluble salt, the second edible, water-soluble salt, and the third edible, water-soluble salt has an average particle size between about 50 micrometers and 200 micrometers.

In some embodiments, the mixture of the first edible, water-soluble salt, the second edible, water-soluble salt, and the third edible, water-soluble salt is mixed and dissolved in the reference amount of drinking water to re-mineralize the drinking water for human ingestion such that the re-mineralized drinking water has a total dissolved solids (TDS) from about 75 milligrams/liter to about 250 milligrams/liter. "TDS" stands for "Total Dissolved Solids". A TDS measurement represents the total concentration of dissolved substances in the water, which can include minerals, salts, and other solids. The amount and type of solids that are dissolved in the water will affect its flavor.

In some embodiments, the mixture of the first edible, water-soluble salt, the second edible, water-soluble salt, and the third edible, water-soluble salt is mixed and dissolved in the reference amount of drinking water to re-mineralize the drinking water for human ingestion such that the re-mineralized drinking water has a TDS of about 150 milligrams/liter.

In some embodiments, the reference amount of drinking water comprises one gallon (approximately 3.785 liters) of drinking water selected from at least one of distilled water, deionized water, reverse osmosis water, and a combination thereof. For instance, in some embodiments, the reference amount of drinking water comprises water that is processed using reverse osmosis.

EXAMPLE 2

Drink Water Treatment Composition

A drink water treatment composition comprises an edible, water-soluble calcium salt that has a weight between about 15% and about 25% by weight of the composition, an edible, water-soluble magnesium salt that has a weight between about 65% and about 75% by weight of the composition and in admixture with the calcium salt, and an edible, water-soluble sodium salt that has a weight between about 5% and about 10% by weight of the composition and in admixture with the calcium salt and the magnesium salt. The mixture of the calcium salt, the magnesium salt, and the sodium salt is packaged in an effective amount to be mixed and dissolved in a reference amount of drinking water to re-mineralize the drinking water for human ingestion.

In some embodiments, the calcium salt comprises calcium citrate, the magnesium salt comprises magnesium sulfate, and the sodium salt comprises sodium chloride.

In some embodiments, the calcium citrate has a weight that is about 20% by weight of the composition, the magnesium sulfate has a weight that is about 70% by weight of the composition, and the sodium chloride has a weight that is about 10% by weight of the composition. As an example, in some embodiments, the treatment composition is packaged as a solid powder, in a package such that the weight of the composition is about 1500 milligrams, the calcium citrate has a weight of about 300 milligrams, the magnesium sulfate has a weight of about 1050 milligrams, and the sodium chloride has a weight of about 150 milligrams.

In some embodiments, each of the edible, water-soluble salts has an average particle size between about 50 micrometers and 200 micrometers.

In some embodiments, the treatment composition is packaged as a solid powder, in a package such that the weight of the composition is about 1500 milligrams, the calcium citrate has a weight of about 300 milligrams, the magnesium sulfate has a weight of about 1100 milligrams, and the sodium chloride has a weight of about 100 milligrams.

In some embodiments, the mixture of the edible, water-soluble salts is mixed and dissolved in the reference amount of drinking water to re-mineralize the drinking water for human ingestion such that the re-mineralized drinking water has a total dissolved solids (TDS) from about 75 milligrams/liter to about 250 milligrams/liter. As with the previous example, a TDS measurement represents the total concentration of dissolved substances in the water, which can include minerals, salts, and other solids. The amount and type of solids that are dissolved in the water will affect its flavor.

In some embodiments, the mixture of the first edible, water-soluble salt, the second edible, water-soluble salt, and the third edible, water-soluble salt is mixed and dissolved in the reference amount of drinking water to re-mineralize the drinking water for human ingestion such that the re-mineralized drinking water has a TDS of about 150 milligrams/liter.

In some embodiments, the reference amount of drinking water comprises one gallon of drinking water selected from at least one of distilled water, deionized water, and a combination thereof.

In some embodiments, the reference amount of drinking water comprises water that is processed using reverse osmosis.

EXAMPLE 3

Drink Water Treatment Composition

In an example implementation, a drink water treatment composition consists of calcium citrate that has a weight of about 20% of the weight of the composition, magnesium sulfate that has a weight of about 73% of the weight of the composition and in admixture with the calcium citrate, and sodium chloride that has a weight of about 7% of the weight of the composition and in admixture with the calcium citrate and the magnesium sulfate. The mixture of the calcium citrate, the magnesium sulfate, and the sodium chloride is packaged in an effective amount to be mixed and dissolved in a reference amount of drinking water to re-mineralize the drinking water for human ingestion.

In some embodiments, each of the calcium citrate, the magnesium sulfate, and the sodium chloride has an average particle size between about 50 micrometers and 200 micrometers.

In some embodiments, the treatment composition is packaged as a solid powder, in a package such that the weight of the composition is about 1500 milligrams, the calcium citrate has a weight of about 300 milligrams, the magnesium sulfate has a weight of about 1100 milligrams, and the sodium chloride has a weight of about 100 milligrams.

In some embodiments, the mixture of the calcium citrate, the magnesium sulfate, and the sodium chloride is mixed and dissolved in the reference amount of drinking water to re-mineralize the drinking water for human ingestion such that the re-mineralized drinking water has a total dissolved solids (TDS) from about 75 milligrams/liter to about 250 milligrams/liter. As noted more fully herein, TDS measurement represents the total concentration of dissolved substances in the water, which can include minerals, salts, and other solids. The amount and type of solids that are dissolved in the water will affect its flavor.

In some embodiments, the mixture of the calcium citrate, the magnesium sulfate, and the sodium chloride is mixed and dissolved in the reference amount of drinking water to re-mineralize the drinking water for human ingestion such that the re-mineralized drinking water has a TDS of about 150 milligrams/liter.

EXAMPLE 4

Method of Making a Drink Water Treatment Composition

A method of making a drink water treatment composition is provided. The method comprises admixing calcium citrate, magnesium sulfate, and sodium chloride in an effective amount to be mixed and dissolved in a reference amount of drinking water to re-mineralize the drinking water for human ingestion.

In some embodiments, admixing includes admixing calcium citrate having a weight between about 15% and about 25% by weight of the composition, magnesium sulfate having a weight between about 65% and about 75% by weight of the composition, and sodium chloride having a weight between about 5% and about 10% by weight of the composition.

In some embodiments, admixing includes admixing calcium citrate having a weight that is about 20% by weight of the composition, magnesium sulfate having a weight that is about 70% by weight of the composition, and sodium chloride having a weight that is about 10% by weight of the composition.

In some embodiments, admixing includes admixing calcium citrate having a weight of about 300 milligrams, magnesium sulfate having a weight of about 1100 milligrams, and sodium chloride having a weight of about 100 milligrams.

In some embodiments, the method further comprises grinding calcium citrate to an average particle size between about 50 micrometers and 200 micrometers, grinding magnesium sulfate to an average particle size between about 50 micrometers and 200 micrometers, and grinding sodium chloride to an average particle size between about 50 micrometers and 200 micrometers.

EXAMPLE 5

Method of Making a Drink Water Treatment Composition

A method of making a drink water treatment composition is provided. The method comprises admixing calcium with an edible, water-soluble salt, by mixing the calcium in an effective amount to prevent caking and clumping of the edible water-soluble salt. The method also comprises packaging the mixture in an effective amount to be mixed and dissolved in a reference amount of drinking water to re-mineralize the drinking water for human ingestion.

In an example configuration, the mixture is dosed into a package less than 2000 milligrams by weight. In yet another example configuration, the drinking water is selected from at least one of deionized water, distilled water, reverse osmosis water, and a combination thereof to re-mineralize the drinking water for human ingestion.

In some embodiments, admixing calcium with an edible, water-soluble salt comprises admixing a select one of calcium citrate, calcium chloride, and calcium carbonate, having a weight between about 15% and about 25% by weight of the composition, with a select one other composition. In a first example, the other composition can comprise a first water-soluble salt comprising magnesium sulfate having a weight between about 65% and about 75% by weight of the composition and a second water-soluble salt comprising sodium chloride having a weight between about 5% and about 10% by weight of the composition. In a second example, the other composition can comprise a first water-soluble salt comprising magnesium sulfate having a weight between about 65% and about 75% by weight of the composition and a second water-soluble salt comprising potassium bicarbonate having a weight between about 5% and about 10% by weight of the composition. In yet a third example, the other composition can comprise a first water-soluble salt comprising magnesium sulfate having a weight between about 5% and about 10% by weight of the composition and a second water-soluble salt comprising potassium bicarbonate having a weight between about 65% and about 75% by weight of the composition.

In certain embodiments, admixing calcium with an edible, water-soluble salt comprises admixing a select one of calcium citrate, calcium chloride, and calcium carbonate, e.g., having a weight of about 300 milligrams with another composition. A first example composition is a first water-soluble salt comprising magnesium sulfate having a weight of about 1100 milligrams and a second water-soluble salt comprising sodium chloride having a weight of about 100 milligrams. A second example composition is a first water-soluble salt comprising magnesium sulfate having a weight of about 1100 milligrams and a second water-soluble salt comprising potassium bicarbonate having a weight of about 100 milligrams. A third example composition is a first water-soluble salt comprising magnesium sulfate having a weight of about 100 milligrams and a second water-soluble salt comprising potassium bicarbonate having a weight of about 1100 milligrams.

In some example implementations, the method of making a drink water treatment composition comprise packaging the mixture by dosing the mixture into a package less than 2000 milligrams by weight. In other example implementations, packaging the mixture in an effective amount to be mixed and dissolved in a reference amount of drinking water comprises packaging the mixture in an effective amount to be mixed with at least one of distilled water, deionized water, reverse osmosis water, and a combination thereof.

In some embodiments, the edible, water-soluble salt comprises magnesium, calcium chloride, potassium bicarbonate or a combination thereof. The method further comprises grinding the edible, water-soluble salt to an average particle size less than 200 micrometers, and then mixing the calcium in an effective amount with the ground edible, water-soluble salt to prevent clumping and caking of the mixture.

In some embodiments, admixing calcium with an edible, water-soluble salt, comprises grinding an amount of the edible, water-soluble salt implemented as magnesium, measuring the amount of magnesium, calculating an amount of calcium implemented as calcium citrate to backfill into the measured amount of magnesium to provide anti-caking, adding the calculated amount of calcium citrate to the measured amount of magnesium, and dividing the measured amount of magnesium by a number of individual doses to achieve a desired predetermined average total dissolved solids (TDS) per dose. A TDS measurement represents the total concentration of dissolved substances in the water, which can include minerals, salts, and other solids. The amount and type of solids that are dissolved in the water will affect its flavor.

In some embodiments, admixing calcium with an edible, water-soluble salt, comprises calculating an amount of a select one of sodium and potassium to backfill into the measured amount of magnesium, and adding the calculated amount of sodium to the measured amount of magnesium.

In some embodiments, the method further comprises using a rolling system to roll the mixture to mix the calcium citrate with the magnesium to prevent caking.

In some embodiments, the method further comprises using a volume method of filling individualized packages of the mixture such that each individual package has the desired predetermined average TDS per dose.

In some embodiments, the method further comprises using a weight method of filling individualized packages of the mixture such that each individual package has the desired predetermined average TDS per dose.

In some embodiments, the method further comprises using at least one of a rolling, shaking, and vibrating system to prevent the calcium citrate from settling in the mixture before packaging.

In some embodiments, the method further comprises grinding the magnesium to a particle size small enough such that when combined with calcium citrate, and applied to the reference amount of drinking water selected from at least one of deionized water, distilled water, reverse osmosis water, and a combination thereof, the water can sit for days, e.g., at least 30 days with no visible signs of sediment of clumping in the water.

EXAMPLE 6

Drink Water Treatment Composition

According to yet further aspects of the present disclosure, a drink water treatment composition is described that can create a low acid profile, which is particularly useful for those individuals that are sensitive to acidic beverages, including coffee. Still further, compositions can complement flavor profiles that are particular to specific beverages, e.g., expresso. For instance, in some embodiments, calcium citrate is combined with potassium bicarbonate, sodium bicarbonate, etc.

As a first illustrative example, a composition well suited for expresso comprises magnesium sulfate, calcium citrate, and potassium bicarbonate. For an example of one gallon (3.785 liters) of drinking water selected from at least one of distilled water, deionized water, reverse osmosis water, and a combination thereof, the composition comprises 1500 mg total, including 1050 mg magnesium sulfate, 300 mg calcium citrate, and 150 mg of potassium bicarbonate.

The same components can be tweaked in ratio for a low acid composition by increasing the ratio of potassium bicarbonate, e.g., For an example of one gallon (3.785 liters) of drinking water selected from at least one of distilled water, deionized water, reverse osmosis water, and a combination thereof, the composition comprises 1500 mg total, including 150 mg magnesium sulfate, 300 mg calcium citrate, and 1050 mg of potassium bicarbonate.

In some examples, the magnesium (e.g., magnesium sulfate) can be eliminated, thus simplifying the composition. The elimination of magnesium can also be implemented for other example configurations described more fully herein.

Sodium bicarbonate can be used to replace potassium bicarbonate, or sodium bicarbonate can be added to the any of the above-compositions. Notably, the only components are the three salts. In other embodiments, there are no sweeteners, artificial sweeteners, vitamins, etc. Indeed, the composition is not intended to sweeten, but rather, to provide the appropriate mineral profile to interact with the base beverage, e.g., oils on coffee beans, to extract flavors. Moreover, particulates are ground down to <200 microns.

MISCELLANEOUS

Through the various examples herein, many different flavor profiles can be developed. By using calcium citrate, and adding other minerals, e.g., one or two (or more) additional salts, specific mineralization profiles can be created that are ideally suited for the natural flavors of a corresponding beverage, e.g., coffee, tea, etc. Moreover, in addition to pulling flavors out of a beverage, the compositions herein can be used to tailor a profile in the range from body to acidity to buffering.

For instance, magnesium can affect the tip and mid tongue. Calcium can affect the back of the tongue. Sodium can balance out the other minerals. This can be used to adjust how a flavor is to be perceived, thus affecting the experience of the drinker of the beverage. For instance, the specific composition, as described herein, can take away/balance acidity to bring out fruity notes, or other characteristics of a beverage, e.g., coffee.

In other example embodiments, deionized water, distilled water, reverse osmosis water is not required. Rather, conventional tap water can be loaded with minerals to achieve a desired flavor profile. The tap water however, changes the starting point and thus the ideal composition may vary dependent upon the tap water composition. For instance, if the available tap water has too much buffer, the composition of the water can be adjusted for a preferred experience.

In any of the above embodiments described more fully herein, sodium bicarbonate can be used in place of potassium bicarbonate. Moreover, sodium bicarbonate can be used in place of magnesium sulfate. Also, in certain embodiments, four compositions can be used together, e.g., calcium citrate, potassium bicarbonate, magnesium sulfate, and sodium bicarbonate. In yet other configurations, only two salts are utilized, e.g., calcium citrate and magnesium sulfate.

Although several examples in the above description describe a drink water treatment composition packaged for treating one gallon of water, it is conceivable that a drink water treatment composition be packaged for treating other than one gallon of water depending upon the particular application. The drink water treatment composition is packaged depending on the particular beverage product in which the drink water treatment composition is used and its size. Accordingly, it is conceivable that a drink water treatment composition be scaled to meet requirements of a particular application.

Also, although the above description describes drink water treatment compositions for a coffee-brewing application, it is conceivable that a drink water treatment composition be provided for other applications. Other example applications include tea brewing and beer brewing.

Further, although the above description describes a drink water treatment composition being used in a combination of deionized water and distilled water, it is conceivable that a drink water treatment composition can be used to treat other types of water in need of being re-mineralized. For example, a drink water treatment composition can be used to treat water that has been purified using reverse osmosis. The drink water treatment composition can be used to treat any combination of purified waters which need to be re-mineralized to provide brewing water for making a flavorful beverage such as coffee.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:
1. A drink water treatment composition comprising:
    a first edible, water-soluble salt that has a weight between about 15% and 25% by weight of the composition, wherein the first edible, water-soluble salt is calcium citrate;
    a second edible, water-soluble salt that has a weight between about 65% and about 75% by weight of the composition and in admixture with the first edible, water-soluble salt; and a third edible, water-soluble salt that has a weight between about 5% and about 10% by weight of the composition and in admixture with the first and second edible, water-soluble salts;

wherein:

the mixture of the first edible water-soluble salt, the second edible water-soluble salt, and third edible water-soluble salt is packaged in an effective amount to be mixed and to be dissolved in a reference amount of drinking water to re-mineralize the drinking water for human ingestion.

2. The drink water treatment composition according to claim 1, wherein:

the second edible, water-soluble salt comprises an edible, water-soluble magnesium salt; and the third edible, water soluble salt comprises an edible, water-soluble sodium salt or an edible, water-soluble potassium bicarbonate salt.

3. The drink water treatment composition according to claim 2, wherein:

the edible, water-soluble magnesium salt comprises magnesium sulfate; and the edible, water-soluble sodium salt comprises sodium chloride; and the edible, water-soluble potassium salt comprises potassium bicarbonate.

4. The drink water treatment composition according to claim 3, wherein:

the calcium citrate has a weight greater than 15% by weight of the composition and less than 25% by weight of the composition.

5. The drink water treatment composition according to claim 3, wherein:

the magnesium sulfate has a weight that is greater than about 70% by weight of the composition and less than about 75% by weight of the composition.

6. The drink water treatment composition according to claim 3, wherein the treatment composition is packaged as a solid powder, in a package such that:

the weight of the composition is about 1500 milligrams; the calcium citrate has a weight of about 300 milligrams; and a select one of the group consisting of:

the magnesium sulfate has a weight of about 1000-1100 milligrams and the sodium chloride has a weight of about 100-150 milligrams;

the magnesium sulfate has a weight of about 1000-1100 milligrams and the potassium bicarbonate has a weight of about 100-150 milligrams; and the magnesium sulfate has a weight of about 100-150 milligrams and the potassium bicarbonate has a weight of about 1000-1100 milligrams.

7. The drink water treatment composition according to claim 6, wherein:

each of the first edible, water-soluble salt, the second edible, water-soluble salt, and the third edible, water-soluble salt has an average particle size between about 50 micrometers and 200 micrometers.

8. The drink water treatment composition according to claim 1, wherein:

the mixture of the first edible, water-soluble salt, the second edible, water-soluble salt, and the third edible, water-soluble salt is mixed and dissolved in the reference amount of drinking water to re-mineralize the drinking water for human ingestion such that the re-mineralized drinking water has a total dissolved solids (TDS) from about 75 milligrams/liter to about 250 milligrams/liter.

9. The drink water treatment composition according to claim 1, wherein:

the reference amount of drinking water comprises one gallon (3.785 liters) of drinking water selected from at least one of distilled water, deionized water, reverse osmosis water, and a combination thereof.

10. A drink water treatment composition consisting of:

a first edible, water-soluble salt that has a weight between about 15% and 25% by weight of the composition, wherein the first edible, water-soluble salt is calcium citrate;

a second edible, water-soluble salt that has a weight between about 65% and about 75% by weight of the composition and in admixture with the first edible, water-soluble salt; and a third edible, water-soluble salt that has a weight between about 5% and about 10% by weight of the composition and in admixture with the first and second edible, water-soluble salts;

wherein:

the mixture of the first edible water-soluble salt, the second edible water-soluble salt, and third edible water-soluble salt is packaged in an effective amount to be mixed and to be dissolved in a reference amount of drinking water to re-mineralize the drinking water for human ingestion.

11. A drink water treatment composition comprising:

a first edible, water-soluble salt that has a weight between about 15% and 25% by weight of the composition, wherein the first edible, water-soluble salt is calcium citrate in powder form;

a second edible, water-soluble salt that has a weight between about 65% and about 75% by weight of the composition and in admixture with the first edible, water-soluble salt, wherein the second edible, water-soluble salt is in powder form; and a third edible, water-soluble salt that has a weight between about 5% and about 10% by weight of the composition and in admixture with the first and second edible, water-soluble salts, wherein the third edible, water-soluble salt is in powder form;

wherein:

the mixture of the first edible water-soluble salt, the second edible water-soluble salt, and third edible water-soluble salt is packaged in an effective amount to be mixed and to be dissolved in a reference amount of drinking water to re-mineralize the drinking water for human ingestion.

\* \* \* \* \*